(12) United States Patent
Décultot et al.

(10) Patent No.: US 11,498,286 B2
(45) Date of Patent: Nov. 15, 2022

(54) SYSTEM AND METHOD FOR HOLDING A WORKPIECE IN POSITION FOR LASER MACHINING AND/OR WELDING THEREOF

(71) Applicant: LASER ENGINEERING APPLICATIONS, Angleur (BE)

(72) Inventors: Marc Décultot, Liège (BE); Anne Henrottin, Lierneux (BE); Jérôme Patars, Huy (BE); Jose-Antonio Ramos De Campos, Angleur (BE); Axel Kupisiewicz, Neupré (BE)

(73) Assignee: LASER ENGINEERING APPLICATIONS, Seraing (BE)

( * ) Notice: Subject to any disclaimer, the term of this patent is extended or adjusted under 35 U.S.C. 154(b) by 0 days.

(21) Appl. No.: 17/255,271

(22) PCT Filed: Jul. 16, 2019

(86) PCT No.: PCT/EP2019/069098
§ 371 (c)(1),
(2) Date: Dec. 22, 2020

(87) PCT Pub. No.: WO2020/016217
PCT Pub. Date: Jan. 23, 2020

(65) Prior Publication Data
US 2021/0170698 A1 Jun. 10, 2021

(30) Foreign Application Priority Data
Jul. 19, 2018 (BE) .................................. 2018/5524

(51) Int. Cl.
*B29C 65/78* (2006.01)
*B23K 26/70* (2014.01)
(Continued)

(52) U.S. Cl.
CPC ........ *B29C 65/7852* (2013.01); *B23K 26/702* (2015.10); *B23K 37/0435* (2013.01);
(Continued)

(58) Field of Classification Search
CPC ... B29C 65/44; B29C 65/1635; B29C 66/742; B29C 66/5326; B29C 66/45; B29C 66/1122; B23K 37/0435; B23K 26/702
See application file for complete search history.

(56) References Cited

U.S. PATENT DOCUMENTS 6,783,622 B1 * 8/2004 Backlund .......... A61F 13/15699
156/250
2011/0200802 A1 8/2011 Li et al.
(Continued)

FOREIGN PATENT DOCUMENTS

DE  3621030 A1  1/1988
EP  1508069 B1  11/2006

OTHER PUBLICATIONS

International Search Report dated Sep. 26, 2019, issued in corresponding International Application No. PCT/EP2019/069098, filed Jul. 16, 2019, 2 pages.
(Continued)

*Primary Examiner* — Daniel McNally
(74) *Attorney, Agent, or Firm* — Christensen O'Connor Johnson Kindness PLLC

(57) ABSTRACT

A system for holding a workpiece in position and exposing it to laser radiation, such that: the workpiece includes a bottom surface and a top surface that are electrically insulated from each other. The system includes an electrostatic charge generating device for generating electrostatic charges on the top surface; an electrically conductive support for forming, on the bottom surface, electrostatic charges of opposite sign to those generated on the top surface; and a
(Continued)

laser device for machining or welding. The electrostatic charge generating device is arranged to be activated before or during the laser machining or welding, such that the workpiece is held in position relative to the electrically conductive support during the machining or welding thereof.

15 Claims, 4 Drawing Sheets

(51) Int. Cl.
    *B23K 37/04*     (2006.01)
    *B29C 65/16*     (2006.01)
    *B29C 65/44*     (2006.01)
    *B29C 65/00*     (2006.01)

(52) U.S. Cl.
    CPC ...... *B29C 65/1616* (2013.01); *B29C 65/1635* (2013.01); *B29C 65/44* (2013.01); *B29C 66/1122* (2013.01); *B29C 66/45* (2013.01); *B29C 66/5326* (2013.01); *B29C 66/7352* (2013.01); *B29C 66/742* (2013.01); *B29C 66/7465* (2013.01); *B29C 66/81262* (2013.01); *B29C 66/81423* (2013.01)

(56) References Cited

U.S. PATENT DOCUMENTS

2012/0211154 A1*   8/2012   Brownell ............ B29C 65/1641
                                                           156/272.8
2017/0136647 A1*   5/2017   Tedeschi ................ B26D 5/005

OTHER PUBLICATIONS

Written Opinion of the International Searching Authority dated Sep. 26, 2019, issued in corresponding International Application No. PCT/EP2019/069098, filed Jul. 16, 2019, 7 pages.

International Preliminary Report on Patentability dated Jan. 19, 2021, issued in corresponding International Application No. PCT/EP2019/069098, filed Jul. 16, 2019, 1 page.

* cited by examiner

SYSTEM AND METHOD FOR HOLDING A WORKPIECE IN POSITION FOR LASER MACHINING AND/OR WELDING THEREOF

TECHNICAL FIELD

According to a first aspect, the invention relates to a system for holding a workpiece (or target, part) in position for its exposure to laser radiation. According to a second aspect, the invention relates to a method for holding a workpiece (or target) in position for its exposure to laser radiation.

BACKGROUND

The need to hold parts to allow them to be machined or welded is well known to the person skilled in the art. The holding and/or contacting of parts prior to machining or welding is very often achieved by means allowing one or more parts to be clamped between two clamping jaws mechanically connected to the machining or welding means.

The machining or welding of rigid and massive parts is generally not a problem and clamping tools for such parts exist. When it is desired to machine or weld smaller parts, flexible substrates or flexible parts, it can become problematic to ensure that the parts are held with sufficient accuracy with respect to a machining device without damaging the parts by clamping the jaws.

The laser machining or laser welding of parts enables precision machining or welding of many types of materials with widely varying properties. The laser machining or welding of parts requires that a part is held securely with respect to the laser device. The laser welding can also require a proper contacting between parts.

US2011/200802 A1 describes a method for laser welding of transparent materials. This document describes that compression means may be required to hold good contact between two parts to be welded. It is also suggested to use transparent compression means when they cover an area to be welded.

The devices for holding and contacting parts to be machined devices of the prior art do not allow a good holding and/or contacting of parts to be machined while allowing accurate laser machining or welding over the entire surface of the parts. Indeed, the use of transparent compression means does not allow a good dosage of the laser power used for machining on the one hand, and a good precision of the position of the machining laser beam on the other hand, because of the transparent compression means passing through. In addition, pressurisation, e.g. with a piston system, can also impair the weld or its quality.

SUMMARY OF THE INVENTION

According to a first aspect, one of the aims of the present invention is to propose a system for holding one or more parts allowing accurate and quality laser machining. Another purpose of the invention is to provide a system for holding parts allowing machining over substantially their entire surface.

For this purpose, the inventors propose a system for holding a workpiece in position and exposing it to laser radiation, such as:
said workpiece comprises:
a workpiece bottom surface;
a workpiece top surface;
said workpiece bottom surface and said workpiece top surface being electrically insulated from each other;
said system comprising:
a first electrostatic charge generating device for generating electrostatic charges on said workpiece top surface;
an electrically conductive support for forming on the workpiece bottom surface electrostatic charges of opposite signs to those generated by said electrostatic charge generating device;
a laser device for machining or welding said workpiece by laser radiation;
said first electrostatic charge generating device being arranged to be activated before or during the laser machining or welding of said workpiece so that said workpiece is held in position relative to said electrically conductive support when exposed to laser radiation. Preferably, the workpiece is held stationary.

The term laser machining should be understood to describe, but not exhaustively: laser soldering, laser cutting, laser thin-film ablation, laser drilling, laser micro-structuring, laser micro-texturing, laser marking, laser engraving . . . . The system of the invention advantageously permits laser machining and/or welding.

The system of the invention makes it possible to apply to a workpiece comprising at least one electrically insulating part electrostatic charges of opposite signs on either side of the workpiece and more particularly on either side of the at least one insulating part.

Preferably, the system for holding in position is also suitable and/or configured to bring the workpiece into contact with the electrically conductive support also causing the holding in position.

In the case where the workpiece comprises a single part in total, the workpiece being electrically insulating, then the first electrostatic charge generating device is able to generate charges on a first surface of the first part and an electrically conductive support electrically grounded make it possible to form electrostatic charges of opposite signs to those generated by said electrostatic charge generating device on the bottom surface of the workpiece so as to generate a very good holding of the part on the support in order to allow it to be machined accurately and without damage to the part due to its holding.

Preferably, the electrically conductive support is metallic, grounded, and configured to receive or support the workpiece, with the workpiece bottom surface positioned in mechanical contact, preferably direct mechanical contact, with the electrically conductive support, so that the workpiece and the electrically conductive support attract each other when oppositely charged.

The electrically conductive support, preferably an electrically conductive plate or curved support, grounded, so that an accumulation of charges of opposite sign to the charges present on the first surface occurs in the conductive plate at the area of contact with the part/workpiece. Thus, the presence of electrostatic charges of opposite sign on the first surface of the part/workpiece and in the conductive plate generates an attractive force between the part/workpiece and the conductive plate so that this attractive force allows the first part/workpiece to be held on the support. Indeed, the attractive force generated by electrostatism between the part and the support can be compared to a force applied by compression as described in the prior art documents. The system of the invention allows a reliable holding in contact between the part/workpiece and the conductive plate as well as a reliable contact between these two parts for laser machining.

Preferably, the system further comprises control means for activating said first electrostatic charge generating device before or during the laser machining or welding of said workpiece to hold it in position relative to said electrically conductive support when exposed to laser radiation generated by said laser device.

If the workpiece comprises two or more parts, then the electrostatic means is either a conductive plate, conductive rollers, or a second electrostatic charge generating device. In all configurations, the system of the invention makes it possible to create a force of attraction between the two parts so that the two parts are held in position relative to each other and the two parts describe good contact between them. In the case where the two parts are in contact with a conductive plate, then the two parts and the electrically conductive support are attracted to each other so that to ensure a proper holding in position of the parts on the conductive plate and a proper contacting of the parts with each other, e.g. for a laser machining application as welding, to weld the two parts together where good contact between the two parts is required.

Preferably, the first electrostatic charge generating device is adapted to hold said workpiece in position on said electrically conductive support when exposed to laser radiation.

In general, the system of the invention allows a good holding of a first part with a second part thanks to a good contacting between the two parts. Good contacting means that the contact surface between the first and the second parts is as large as possible. The system of the invention allows a good contacting because the electrostatic forces allow a mutual attraction of the first and second parts to each other, which allows the parts to conform more easily to each other. Thus the good contact between the two parts allows the generation of greater frictional forces when a shearing force is applied between the two parts, which explains why the two parts are well held together or why one or more parts are well held on the electrically conductive support.

The insulating part or an insulating element included in the workpiece is preferably a dielectric material which opposes the passage of an electric current. The insulating part of the workpiece of the invention is considered to be insulating as long as it is not subjected to an electric field close to or greater than an electric field of breakdown of the insulating material. The electrically insulating part is intended to prevent the passage of an electric current and preferably to prevent the passage of an electric current between the workpiece top surface and the workpiece bottom surface.

The insulating part can comprise several insulating parts, the insulating part is for example a sheet comprising a polymer material, a glass or ceramic plate . . . .

The system of the invention is particularly suitable for laser machining because it is non-contact machining. Indeed, a machining with a milling cutter, an arc welding, an abrasion requires contact of the surface of the workpiece with a tool. Such a contact could result in the unloading of one of the surfaces of the workpiece so that the holding of the part is no longer ensured. It has been observed that the interaction between the laser and the workpiece does not result in any or negligible changes in the holding or contacting of the workpiece.

Several types of welding can be implemented using the system of the invention listed below in a non-exhaustive manner:

welding of a transparent polymer substrate with another transparent polymer substrate;

welding of a transparent polymer substrate with an opaque polymer substrate;

welding a transparent polymer substrate with a transparent glass substrate, the transparent glass substrate which may be located above or below the transparent polymer substrate relative to the laser source;

welding of a glass substrate with an opaque polymer substrate;

pressurisation of several metal layers and the possibility of welding simultaneously a transparent polymer and a metal;

welding of a transparent polymer substrate with a metal substrate;

welding of an opaque polymer substrate with a metal substrate by conduction of the energy delivered by the laser via the metal substrate;

welding a polymer substrate, glass, . . . with a ceramic material;

welding a polymer substrate to a three-dimensional substrate;

welding a transparent polymer substrate to another transparent polymer substrate and/or to a metal substrate using a roller feed system.

The system of the invention is particularly advantageous with regard to the welding of two parts together because the system of the invention makes it possible to impose a good contact between the two parts of the workpiece so that the welding at the interface between the two parts is very homogeneous. This is possible thanks to a contacting which is due to the mutual attraction of the two parts to each other. The system of the invention is particularly well suited to parts with a certain flexibility, i.e. the part can conform to another part without affecting its mechanical properties. The system is particularly advantageous when at least one part is flexible and is able to conform to the other rigid part.

The system of the invention allows a very good holding of a part on a support or a part on another part so that the part and the support or both parts are kept in contact during the laser machining or welding.

With regard to welding, current contacting systems using a piston and a pressure plate can lead to problems of weld homogeneity due, among other things, to the inhomogeneity of the part under pressure. To avoid problems due to the plate, then, it is possible to machine through a hole, but this limits the field of machining and causes problems of pressure uniformity at the hole. In the context of microfluidic systems, current contacting systems using a piston and a pressure plate can pose the following problem. The pressure plate is usually substantially flat, which is not always the case with the surface in contact with it of the sample (or target, or workpiece). A relatively high pressure force must be applied to achieve satisfactory contact. The application of such a relatively high compressive force may induce deformation, damage, and/or filling of the microchannels. The system of the invention, which does not require the use of a pressure plate, makes it possible to overcome these problems so as to obtain welds, in particular micro-fluidic welds of good quality and with good control.

Moreover, the holding and contacting systems of the prior art require contact with the materials to be welded or machined and make it difficult to carry out welding or machining of curved surfaces, a problem which the system of the invention makes it possible to solve.

Preferably, the holding or contacting force can be controlled by monitoring the electrostatic charge generating device. Preferably, the first electrostatic charge generating device is controlled by control means. Preferably, the control means are included in the system of the invention.

In general, the greater the space between the charged surfaces, the smaller the forces generated between the parts located between the charged surfaces will be. A consequence of this is that the greater the gap between the charged surfaces, the greater the amount of charge will have to be to ensure a good holding and/or contacting.

The system of the invention is particularly advantageous for the assembly of substrates, e.g. for microfluidic applications or substrates comprising channels requiring the cleanest, most reproducible and qualitatively high quality channel welds possible. The system of the invention ensures homogeneous welds with precise contours. This is particularly advantageous for microfluidics applications as previously formed microchannels may not be too much modified by the weld.

Preferably the electrically conductive support is grounded indirectly, i.e. a direct connection by means of an electric cable is not necessary, but a connection is obtained indirectly by means of elements in contact with or close to the electrically conductive support.

Preferably, said means are biasing means, preferably electrostatic biasing means.

Preferably said workpiece comprises a first part, preferably said workpiece comprises a first part and a second part, even more preferably said workpiece comprises a first part, a second part and a third part. Nevertheless, said workpiece may comprise more than three parts. In particular, it could comprise four, five, six or more parts.

Preferably, the first part comprises a first part bottom surface and a first part top surface;
said second part comprises a second part bottom surface and a second part top surface;
said workpiece being such that said second part bottom surface is positioned substantially in mechanical contact with said first part top surface;
said first part bottom surface being said workpiece bottom surface and said second part top surface being said workpiece top surface.

Preferably, said first part is electrically insulating.
Preferably, said second part is electrically insulating.
If there are more than two parts (four, five, six), each additional part may be electrically insulating in variants of the invention.

Preferably, said electrostatic charge generating device is arranged to be activated prior to machining or welding of said first and second parts by the laser device (or other additional part when there are three or more parts).

Preferably, said first part (second, third or other additional part) is transparent or opaque to said laser radiation from said laser device.

A transparent or opaque part is, for example, transparent or opaque in the visible wavelength range. Transparent or opaque in the visible means that it is possible to see or not see through the part. For example, an average absorption in the visible range of 50% means that it is possible to see through. For example an absorption of 1 (or 100%) does not allow you to see through and therefore defines an opaque part. A transparent or opaque part can be transparent or opaque in a different wavelength range from the visible. For example, a part is transparent or opaque in a wavelength range corresponding to the emission wavelength of laser radiation coming from the laser device. For example, the part is transparent or opaque in the near infrared NIR range.

Preferably, said first part (second, third, or other additional part) comprises at least one of the following materials: polymer, glass, or ceramic.

Preferably, said electrostatic charge generating device is spaced from said workpiece top surface for generating charges without mechanical contact with said workpiece top surface.

Preferably, said means comprises an electrically conductive support, preferably metallic, grounded configured to receive or support said workpiece, said workpiece bottom surface being positioned in mechanical contact, preferably direct mechanical contact, with said electrically conductive support so that said workpiece and said electrically conductive support attract each other when oppositely charged.

Preferably, the electrically conductive support is mounted on a moving system, for example, a 2-axis (X, Y) moving system, for example, a 3-axis (X, Y, Z) moving system, for example, a 5-axis moving system, for example, a 7-axis moving system.

Preferably, said first part comprises a conductive material, preferably a metallic material.

Preferably, said electrically conductive support is a flat plate, preferably a metallic flat plate.

A flat plate means that a surface of the plate which is intended to come into contact with said first part bottom surface is substantially inscribable in a plane.

Preferably, said first part is electrically insulating and said second part comprises an electrically conductive material.

Preferably said first part top surface extends around said second part bottom surface, preferably said second part is substantially centered on said first part.

Preferably said first part bottom surface is non-planar, preferably curved, and said electrically conductive support comprises a non-planar surface, preferably curved, adapted to come into mechanical contact with said first part bottom surface.

Preferably said first part top surface having a non-planar surface, preferably curved, and said second part bottom surface comprises a non-planar surface, preferably curved, adapted to come into mechanical contact with said first part top surface, preferably the whole of said second part bottom surface is adapted to come into mechanical contact with said first part top surface so as to be held in position thereon.

Preferably, said electrically conductive support is a grounded metal roller configured to guide and/or support said workpiece by coming into mechanical contact with said workpiece bottom surface.

Preferably, said means comprises a second electrostatic charge generating device for generating electrostatic charges on said workpiece bottom surface so as to charge said this surface with opposite charges to those charged on said workpiece top surface.

Preferably, said second electrostatic charge generating device is remote from said workpiece bottom surface to generate charges without mechanical contact with said workpiece bottom surface.

Preferably, said workpiece further comprises:
a third part comprising a third part bottom surface and a third part top surface;
said workpiece being such that said third part bottom surface is positioned substantially in mechanical contact with said second part top surface;
said first part bottom surface being said workpiece bottom surface and said third part top surface being said workpiece top surface.

Preferably, said system further comprises moving means for moving the workpiece between said first and second electrostatic charge generating devices, preferably said movement is synchronized with a use of said laser device.

Preferably, said first part is a transparent polymer substrate comprising channels having at least a submicrometer dimension, preferably for microfluidic applications. Said channels may have dimensions greater than one micrometer, 10 micrometers or 100 micrometers. For example, channels may have dimensions less than a millimetre, preferably less than 500 micrometres.

Preferably, the first part is a substrate comprising a channel and the second part is a planar substrate.

Preferably, a part (first, second, third) is a copolymer or a cycloolefin polymer (COC) or (COP).

Preferably, a part has a thickness of less than 5 mm, preferably less than 2 mm, even more preferably less than 1 mm, e.g. less than 500 µm. Preferably a part with a thickness between 100 µm and 5 mm, preferably between 200 µm and 2 mm, even more preferably between 250 µm and 1 mm, e.g. between 250 µm and 750 µm.

Preferably, the laser device is configured to emit picosecond and femtosecond pulses. Preferably, the laser device is configured to emit pulses with a duration comprises between $10^{-15}$ s to $10^{-9}$ s, more preferably comprises between $10^{-15}$ s to $10^{-10}$ s, and even more preferably comprises between $10^{-12}$ s to $10^{-10}$ s.

Preferably, a part with a Young's modulus greater than 1 GPa, more preferably greater than 2 GPa, more preferably greater than 3 GPa. For example greater than 50 GPa. A material with such a Young's modulus greater than 1 GPa can be considered rigid.

The advantage of the invention is that it is possible to machine or weld one or more rigid parts with a high precision. In fact, thanks to the absence of compression means for holding one or more rigid parts with respect to the electrically conductive support, it is possible to carry out very fine machining and/or welding with a weld seam which is well controlled spatially. Another advantage of the system and the method of the invention is that it is possible to machine and/or weld parts of any size without having to adjust compression means. This is particularly advantageous for small parts. Small parts have a maximum dimension of less than 5 cm, preferably less than 2 cm. Such parts would not be machinable by a roll-to-roll technique but are machinable by the system and method of the invention.

Preferably, the system of the invention further comprises a robotic arm for bringing said workpiece into contact with said electrically conductive support.

According to another embodiment, the system of the invention further comprises a conveyor belt for bringing said workpiece into contact with said electrically conductive support.

According to another embodiment or in combination with the two above-mentioned embodiments, the electrically conductive support comprises means for movement along two axes.

Preferably, said electrically conductive support is black in colour. The electrically conductive support is black to allow good visualization of the position of the workpiece when adjusting the position of the laser radiation on the workpiece for machining or welding of an substantially transparent workpiece.

A conductive-on-conductive configuration is possible when sandwiched between two parts, at least one of which is electrically insulating. It is therefore possible to use welding with electrostatics for all material combinations in which at least one of the materials is non-conductive in order to be able to retain static charges.

For example, the invention consists of bringing into contact and holding this contact with an ionizing bar, thus electrostatically bringing two transparent polymer plates into contact. Then, a femtosecond laser source (or other laser source) is used to weld the two transparent polymers. The invention makes it possible not to use conventional pressurization means using a piston in order not to deform the polymer plates and/or to avoid the presence of an additional transparent plate between the scanner head positioned after the laser source and the sample. The electrical charges placed on the plates allow a strong and close contact between the polymer plates allowing laser welding.

The results obtained with the system of the invention are very good, e.g. a cohesive weld (i.e. when the two plates that had been welded together are detached, on one plate the material of the other plate remains welded) is observed in a reproducible manner. The pressurisation is also more uniform, which is not always possible with the standard pressurisation techniques. A particularly well-suited application is, for example, the microfluidics, because the welds obtained by the system of the invention are such that a fluid does not pass through them, thus guaranteeing a good hermeticity of the welded area, in particular of the channels constituting a microfluidic substrate.

The invented contacting system also facilitates pressurisation between 3D-shaped polymers. The system of the invention is therefore a non-contact pressurization system.

In the case of using the system for welding, the visualization of the weld quality can be achieved via an optical microscope, confocal, or via tensile and/or hermeticity tests. In addition, the system of the invention is particularly well suited as it does not have a compression plate, contrary to the prior art systems. In the prior art systems, the plate of the pressurising system hinders the detection of parts to be machined or welded, for example with microscopic cameras (focal length too small) or with confocal cameras (surface of the pressurising plate detected). Preferably the system of the invention facilitates the detection of the sample, even after/during the pressurisation.

Preferably, the system of the invention makes it possible to adhere surfaces which are not perfectly flat, without deforming them. Preferably, the system of the invention does not have a pressurizing plate, so there is no risk of damage to the pressurizing plate.

According to a second aspect, one of the aims of the present invention is to propose a method of holding and/or bringing parts into contact for laser machining which allows precise and quality machining. Another aim of the invention is to allow a machining over substantially the entire surface of one or more parts to be machined without the constraint of mechanical compression means.

For this purpose, the inventors propose a method for holding a workpiece in position and exposing it to a laser radiation, said workpiece comprising:
a workpiece bottom surface;
a workpiece top surface;
said workpiece bottom surface and said workpiece top surface being electrically insulated from each other;
the method comprising the following steps:
a) providing a system comprising:
a first electrostatic charge generating device for generating electrostatic charges on said workpiece top surface;
an electrically conductive support for forming electrostatic charges of opposite signs to those generated by said electrostatic charge generating device on said workpiece bottom surface;

a laser device for laser machining or laser welding of said workpiece;

b) positioning said workpiece on said electrically conductive support;

c) activating said first electrostatic charge generating device to generate electrostatic charges on said workpiece top surface so as to form electrostatic charges of opposite signs to those generated by said electrostatic charge generating device on said workpiece bottom surface to hold said workpiece in position on said electrically conductive support;

d) irradiating said workpiece with said laser device for laser machining or welding, preferably irradiating said workpiece top surface.

The variants and advantages mentioned for the system according to the first aspect of the invention apply to the method according to the second aspect, mutatis mutandis.

Preferably, the electrically conductive support is grounded and is configured to receive said workpiece to be machined, said workpiece bottom surface being positioned in contact with said electrically conductive support at least partially, so that said workpiece to be machined and said electrically conductive support attract each other after step c).

Preferably, said workpiece comprises:
a first part comprising a first part bottom surface and a first part top surface;
a second part comprising a second part bottom surface and a second part top surface;
said workpiece is such that said second part bottom surface is positioned substantially in mechanical contact with said first part top surface;
said first part bottom surface being said workpiece bottom surface and said second part top surface being said workpiece top surface.

Preferably, said first part is electrically insulating.

Preferably, said second part is electrically insulating.

Preferably, said electrostatic charge generating device is activated before machining said first and second parts.

Preferably, said first part is transparent or opaque to laser radiation from said laser device.

In a preferred embodiment, said first part is a conductive material, preferably a metallic material.

Preferably, said first part is electrically insulating and said second part is electrically conductive.

Preferably, said electrically conductive support is a flat metal plate.

In a preferred embodiment, said first part is electrically insulating and said second part is electrically conductive.

Preferably, said first part bottom surface is non-planar, preferably curved, and said electrically conductive support comprises a non-planar surface, preferably curved, adapted to come into mechanical contact with said workpiece (or first part) bottom surface, said first electrostatic charge generating device is moved during step c) over said workpiece top surface without mechanical contact so as to charge it over substantially its entire surface.

Preferably said first part top surface having a non-planar surface, preferably curved, and said second part bottom surface comprising a non-planar surface, preferably curved, adapted to come into mechanical contact with said first part top surface, preferably the whole of said second part bottom surface is adapted to come into mechanical contact with said first part top surface so as to be held in position thereon.

Preferably, said first electrostatic charge generating device is moved so as to remain at an substantially constant distance from said workpiece top surface.

Moving the first electrostatic charge generating device over the workpiece ensures a homogeneous polarization over the entire workpiece surface and in particular the first part top surface so as to generate a holding force in position which is as homogeneous and reproducible as possible. This has the advantage to make possible a contacting with forces at the homogeneous interface between the first and second part.

Preferably, said first electrostatic charge generating device is moved over said workpiece top surface before initiating the laser machining in step d).

Preferably, said electrically conductive support is a grounded metal roller configured to guide and/or support said workpiece by coming into mechanical contact with said workpiece bottom surface.

In another embodiment not being part of the invention, a second electrostatic charge generating device is provided such that step c) further comprises activating said second electrostatic charge generating device to generate electrostatic charges on said workpiece bottom surface so as to charge this surface with opposite charges to those charged on said workpiece top surface. Preferably, said second electrostatic charge generating device is remote from said workpiece bottom surface to generate charges without mechanical contact with said workpiece bottom surface.

Preferably, said workpiece further comprises:
a third part comprising a third part bottom surface and a third part top surface;
said workpiece is such that said third part bottom surface is positioned substantially in contact with said second part top surface;
said first part bottom surface being said workpiece bottom surface and said third part top surface being said workpiece top surface.

According to another embodiment not being part of the present invention, said workpiece further comprises moving means and in that said method further comprises the following additional step:

(e) moving the workpiece between said first and second electrostatic charge generating devices in synchronism with the use of the laser machining device of step (d).

Preferably, the holding and/or contacting method could be adapted and used for hybrid welding between a metal and a polymer, or an opaque polymer at the wavelength of the laser beam and a transparent polymer at that wavelength, or between two glass plates. Another variant of the method of the invention is the use of other laser sources (pulse duration ps, ns, CW, and different wavelengths: 250 nm up to 12 µm . . . ). For hybrid welding, a laser diode is sufficient, as well as for welding between an opaque polymer and a transparent one. It is also envisaged to charge the materials with devices other than an ionizing bar, e.g. an ionizing blower.

Preferably said first part is a substrate comprising a channel and in that said second part is a planar substrate, the step d) of irradiation comprises the irradiation of the workpiece at the interface between said first and said second part, at the edges of said channel to form a sealed weld between said first and said second at the edges of said channel to form a microfluidic circuit.

According to another embodiment not being part of the present invention, the inventors propose a system for holding a workpiece in position for exposure to laser radiation, such as:
said workpiece comprising:
a workpiece bottom surface;
a workpiece top surface;

said workpiece bottom surface and said workpiece top surface being electrically insulated from each other;

said system comprising:

a first electrostatic charge generating device for generating electrostatic charges on said workpiece top surface;

means for forming electrostatic charges of opposite signs to those generated by said electrostatic charge generating device (preferably on said workpiece bottom surface);

a laser device for machining or welding said workpiece by exposure to said laser radiation;

said electrostatic charge generating device being arranged to be activated before or during machining or welding of said workpiece so that said workpiece is held in position upon exposure to laser radiation. The variants and advantages of the different embodiments of the invention apply to the present embodiment, mutatis mutandis.

BRIEF DESCRIPTION OF THE FIGURES

These and other aspects of the invention will be clarified in the detailed description of particular embodiments of the invention, with reference being made to the drawings of the figures, in which.

The drawings of the figures are not to scale. Generally, similar elements are denoted by similar references in the figures. The presence of reference numbers in the drawings cannot be regarded as limiting, even when such numbers are indicated in the claims.

DETAILED DESCRIPTION OF THE INVENTION

Figure 1:
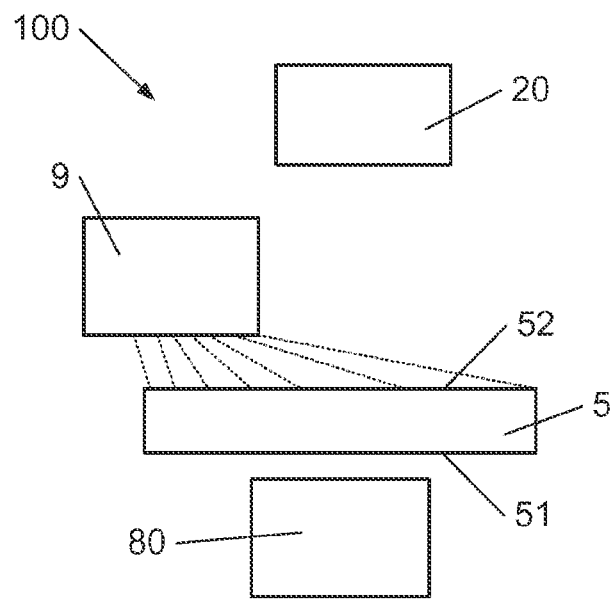
FIG. 1 shows an embodiment according to the invention.

FIG. 1 shows an example of embodiment of the system 100 according to the invention where the workpiece 5 is positioned between the first electrostatic charge generating device 9 and an electrically conductive support 80, preferably metallic, grounded directly or indirectly. The electrically conductive support 80 is configured to be positioned close to the workpiece bottom surface 51. For example, the electrically conductive support 80 is positioned at a distance between 1 mm and 10 mm. For example the workpiece 5 is held at this distance by using support elements that can be electrically conductive or electrically insulating. This embodiment is particularly well suited to avoid damaging a workpiece bottom surface 51, which would be brittle or have a brittle pattern. This embodiment of the invention can also be used with a zero distance between the workpiece 5 and the electrically conductive support 80. The electrically conductive support 80 is configured to receive said workpiece bottom surface 51 so that the electrically conductive support 80 and the workpiece 5 are within electrostatic range so that the activation of the first electrostatic charge generating device 9 allows mutual attraction between the electrically conductive support 80 and the workpiece 5. The laser device 20 is positioned so as to emit laser radiation towards the workpiece top surface 52. It can be envisaged to emit a laser radiation towards the workpiece bottom surface 51. This embodiment is particularly suitable for a system for machining the workpiece 5 or for welding a workpiece comprising at least two parts 1, 2. The first electrostatic charge generating device 9 and the electrically conductive support 80 ensure good contact between the two parts 1, 2 so that they are in good contact when welding them together by laser radiation. When machining or welding the workpiece 5, a good hold on the electrically conductive support 80 is thus obtained, allowing good machining or welding precision.

Figure 2:
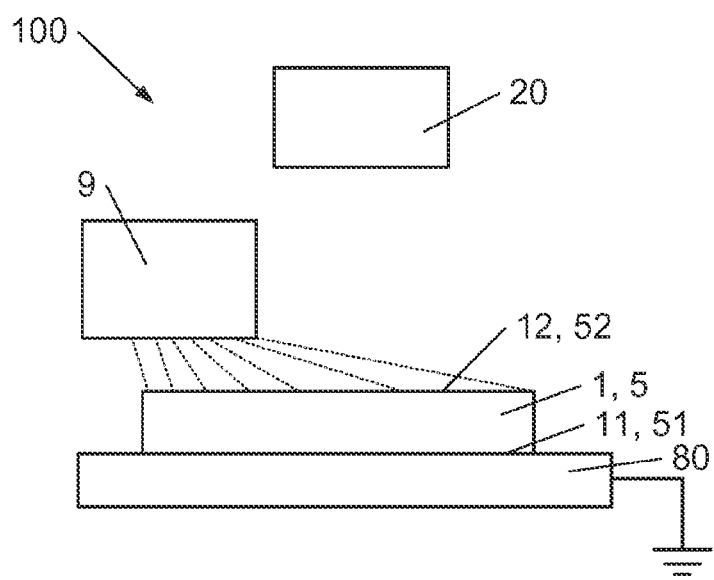
FIG. 2 shows an embodiment according to the invention.

FIG. 2 shows an example of embodiment of the system 100 according to the invention where the workpiece 5 comprises the first part 1 between the first electrostatic charge generating device 9 and the electrically conductive support 80, preferably metallic, grounded directly or indirectly. The electrically conductive support 80 is configured to receive or support the first part 1, said first part bottom surface 11 being positioned in mechanical contact, preferably direct, with the electrically conductive support 80, so that the first part 1 and the electrically conductive support 80 attract each other when they are oppositely charged. The laser device 20 is positioned so as to emit laser radiation to the first part top surface 12. It can be envisaged to emit a laser radiation to the first part bottom surface 11. This embodiment is particularly suitable for a system for machining the first part 1 so that the system of the invention 100 can ensure that the first part 1 is held in position on the electrically conductive support 80, thus enabling good machining accuracy.

Figure 3:
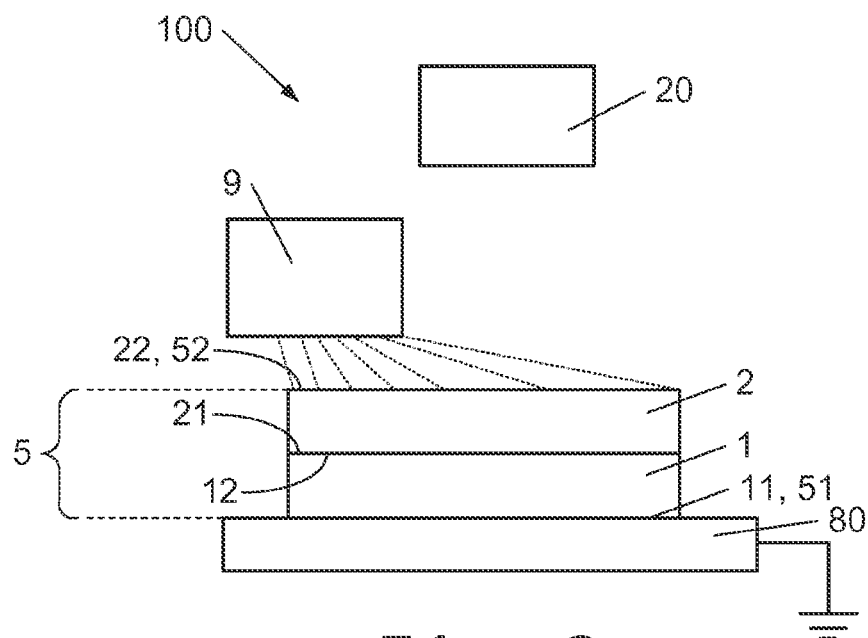
FIG. 3 shows an embodiment according to the invention.

FIG. 3 shows an example of embodiment of the system 100 according to the invention where the workpiece 5 comprises the first part 1 and the second part 2 so that the first 1 and second 2 parts are positioned between the first electrostatic charge generating device 9 and the electrically conductive support 80, preferably metallic, grounded directly or indirectly. The electrically conductive support 80 is configured to receive or support the first 1 and second 2 parts, with the first part bottom surface 11 being positioned in mechanical contact, preferably direct, with the electrically conductive support 80. The second part top surface 22 is attracted to the electrically conductive support 80 because they are oppositely charged. The laser device 20 is positioned so as to emit laser radiation to the second part top surface 22. It can be envisaged to emit a laser radiation to the first part bottom surface 11 by using a suitable electrically conductive support. This embodiment is particularly suitable for a system for machining or welding the first 1 and second 2 parts. The first electrostatic charge generating device 9 and the electrically conductive support 80 allow good contact between the first 1 and second 2 parts so that they are in good contact when they are welded by the laser radiation. In particular, this ensures high precision and high welding quality. This embodiment is particularly suitable for microfluidic circuit applications. For the machining of the first 1 and second 2 parts, a good hold on the electrically conductive support 80 is thus achieved, allowing good machining accuracy.

Figure 4:
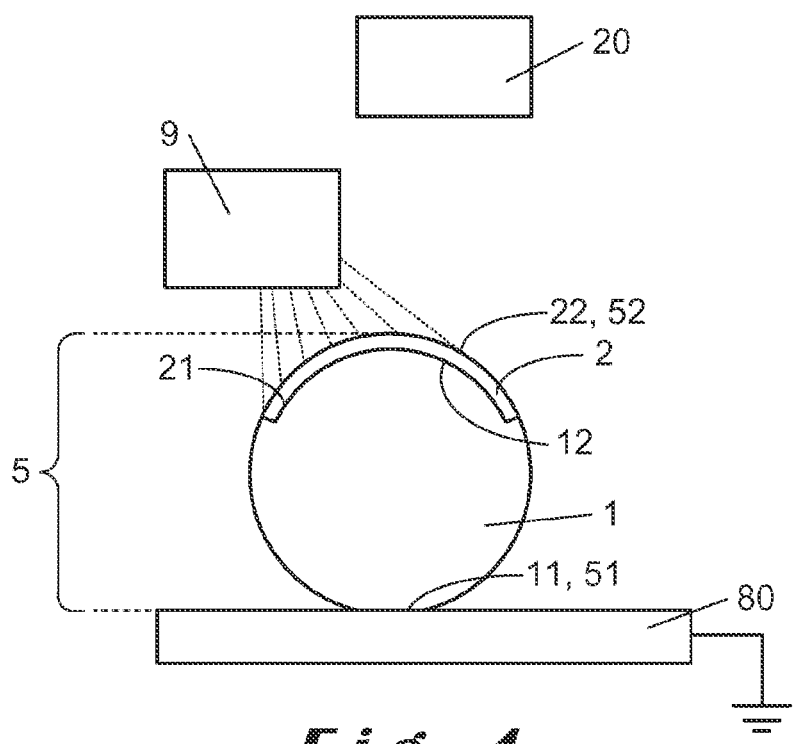
FIG. 4 shows an embodiment according to the invention.

FIG. 4 shows an embodiment of the system 100 according to the invention, where the workpiece 5 comprises the first part 1 and the second part 2, with the first part 1 having a non-planar first part top surface 12, preferably curved or saw-toothed. Preferably the second part 2 positioned in mechanical contact at its bottom surface 21 with the first part top surface 12. For example, the second part 2 is rigid and its bottom surface 21 has a morphology similar to that of the first part top surface 12 so as to ensure as much mechanical contact between the two parts 1, 2 as possible before the use of the system 100 of the invention. For example, the second part is flexible so that it can conform to the first part top surface 12. A conformation of the second part 2 to the morphology of the first part top surface 12 is preferably achieved with the system of the invention which makes it possible to impose a mutual attraction between the first 1 and second 2 parts so as to maximise the contact between the first part top surface 12 and the second part bottom surface 21. This embodiment illustrates in a general way that the system 100 of the invention allows the holding in position and/or the bringing into contact of the parts having non-planar surfaces extending in the three dimensions.

In the embodiment in FIG. 4, the first 1 and second 2 parts are positioned between the first electrostatic charge generating device 9 and the electrically conductive support 80, preferably metallic, directly or indirectly grounded. The electrically conductive support 80 is configured to receive or support the first 1 and second 2 parts, with the first part bottom surface 11 positioned in mechanical contact, preferably direct, with the electrically conductive support 80. The second part top surface 22 is attracted to the electrically conductive support 80 because they are oppositely charged. The laser device 20 is positioned so as to emit laser radiation towards the second part top surface 22. This embodiment is particularly suitable for a system for machining or welding the first 1 and second 2 parts. The first electrostatic charge generating device 9 and the electrically conductive support 80 ensure a good contact between the first 1 and second 2 parts so that they are in good contact when they are welded by the laser radiation.

Figure 5:
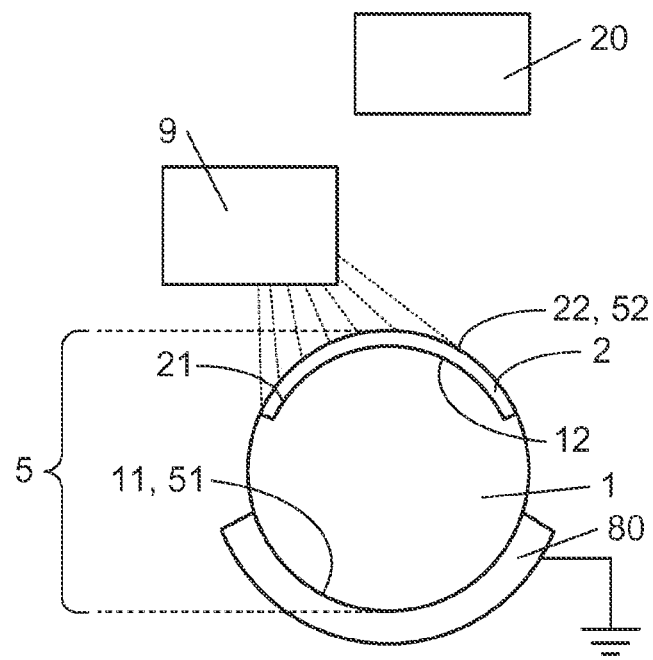
FIG. 5 shows an embodiment according to the invention.

FIG. 5 shows an embodiment of the system of the invention which incorporates all the characteristics of the embodiment in FIG. 4 except for the electrically conductive support 80 that in the case of a workpiece 5 or a first part having a non-planar, curved or saw-toothed bottom surface 51,11, then the electrically conductive support 80 provides a mechanical contact surface with the bottom surface 51,11 which allows a greater increase in contact than when the electrically conductive support 80 is planar. Moreover, this embodiment of the invention allows for a wedging of the workpiece 5 in the case of a spherical workpiece 5, which will have a tendency to roll or tilt. With the embodiment shown in FIG. 5, the electrically conductive support 80 makes it possible to provide a good support for the first 1 and second 2 parts so as to ensure good machining and/or welding precision.

Figure 6:
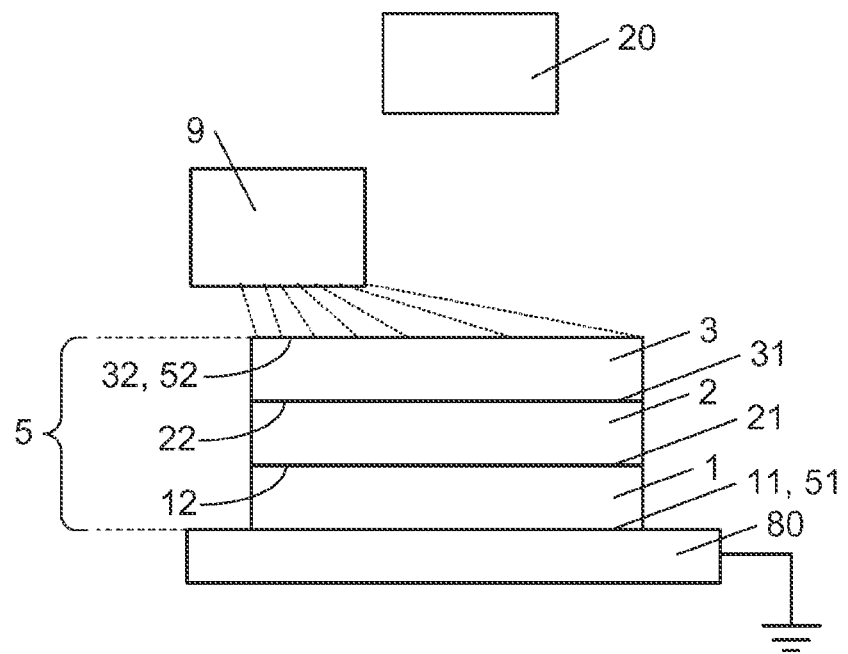
FIG. 6 shows an embodiment according to the invention.

FIG. 6 shows an example of embodiment of the system 100 according to the invention where the workpiece 5 comprises the first part 1, the second part 2 and the third part 3 so that the first 1, second 2 and third 3 parts are positioned between the first electrostatic charge generating device 9 and the electrically conductive support 80, preferably metallic, which is directly or indirectly grounded. The electrically conductive support 80 is configured to receive or support the first 1, second 2 and third 3 parts, with the first part bottom surface 11 positioned in mechanical contact, preferably direct, with the electrically conductive support 80. The second part top surface 22 is attracted to the electrically conductive support 80 because they are oppositely charged. The laser device 20 is positioned so as to emit laser radiation to the third part top surface 32. It can be envisaged to emit a laser radiation to the first part bottom surface 11 by using a suitable electrically conductive support 80. This embodiment is particularly suitable for a system for machining or welding the first 1, second 2 and third 3 parts. The first electrostatic charge generating device 9 and the electrically conductive support 80 ensure a good contact between the first 1 and second 2 parts so that they are in good contact when they are welded by laser radiation. When machining the first 1, second 2 and third 3 parts, the electrically conductive support 80 is held in position, thus ensuring good machining accuracy.

Figure 7:
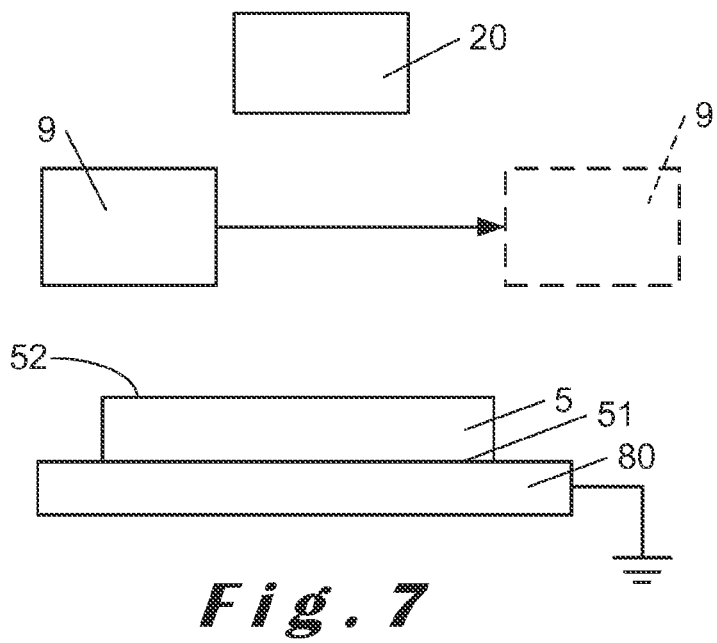
FIG. 7 shows an embodiment according to the invention.

FIG. 7 shows an embodiment of the system of the invention corresponding, for example, to the embodiments in FIGS. 1b, 2, 3, 6 where the first electrostatic charge generating device 9 is moved away from the workpiece top surface 52. The first electrostatic charge generating device 9 is moved substantially over the entire workpiece top surface 52 so as to charge the workpiece top surface 52 (or the top surface of the first part 12, the second part 22, the third part 32) over its entire surface so as to generate a charge density on the top surface 52, 12, 22, 32 which is as homogeneous and reproducible as possible so as to ensure that it is held in position relative to the electrically conductive support 80. When several parts are comprised in the workpiece 5: two parts 1, 2; three parts 1, 2, 3; four parts . . . , the fact of moving the first electrostatic charge generating device 9 above the top surface of the part being the workpiece top surface 52, the homogeneity of the charge density at the surface 52 makes it possible to ensure homogeneous contact between the top surfaces 12, 22, 32, . . . and the bottom surfaces 11, 21, 31, . . . of the different parts 1, 2, 3 . . . in contact.

Figure 8:
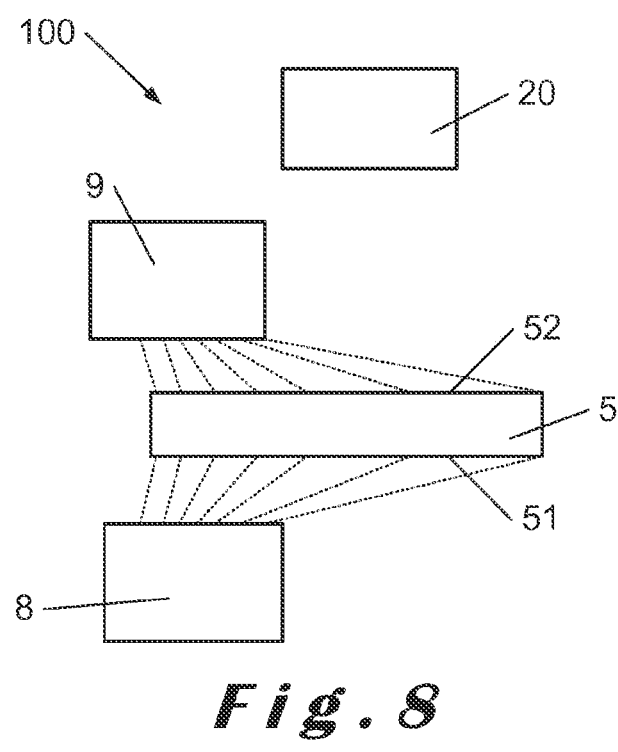
FIG. 8 shows an embodiment not forming part of the invention.

FIG. 8 shows an example of embodiment of a system 100 not being part of the invention where the workpiece 5 is positioned between the first electrostatic charge generating device 9 and the second electrostatic charge generating device 8 so that the workpiece bottom surface 51 and the workpiece top surface 52 can be charged with charges of opposite sign. The laser device 20 is positioned so as to emit a laser radiation toward the workpiece top surface 52. It can be envisaged to emit a laser radiation toward the workpiece bottom surface 51. This embodiment is particularly suitable for a system for films welding by rolls, where the workpiece 5 comprises at least two film parts which can be passed between the first 9 and second 8 electrostatic charge generating devices so that the two film parts are in good contact when being welded by the laser radiation. The two parts are the first part 1 and the second part 2. The workpiece top surface 52 is charged by the electrostatic charges generated by the first electrostatic charge generating device 9.

The present invention has been described with respect to specific embodiments, which are purely illustrative and should not be regarded as limiting. In general, the present invention is not limited to the examples illustrated and/or described above. The use of the verbs "include", "comprise", or any other variant, as well as their conjugations, can in no way exclude the presence of elements other than those mentioned. The use of the indefinite article "an", "a", or the definite article "the" to introduce an element does not exclude the presence of a plurality of these elements. The reference numbers in the claims do not limit their scope.

In summary, the invention may also be described as follows.

A system 100 for holding a workpiece 5 in position and exposing it to laser radiation, such as:

said workpiece 5 comprises a bottom surface 51 and a top surface 52 electrically insulated from each other;

said system 100 comprising:

an electrostatic charge generating device 9 for generating electrostatic charges on said top surface 52;

an electrically conductive support 80 for forming on the bottom surface 51 electrostatic charges of opposite sign to those generated on said top surface 52;

a laser device 20 for machining or welding 5;

said electrostatic charge generating device 9 being arranged to be activated before or during laser machining or welding so that said workpiece 5 is held in position relative to said electrically conductive support 80 during machining or welding.

The invention claimed is:

1. A system for holding a workpiece in position and exposing the workpiece to laser radiation,
said workpiece having
a workpiece bottom surface and
a workpiece top surface, said workpiece bottom surface and said workpiece top surface being electrically insulated from each other,
said system comprising:
a first electrostatic charge generating device for generating electrostatic charges on said workpiece top surface;
an electrically conductive support configured to form on the workpiece bottom surface electrostatic charges of opposite sign to those generated by said electrostatic charge generating device;
a laser device configured for machining or welding said workpiece by laser radiation;
said first electrostatic charge generating device being arranged to be activated before or during laser machining or welding of said workpiece so that said workpiece is held in position relative to said electrically conductive support when exposed to laser radiation.

2. The system according to claim 1, wherein said workpiece comprises one or more parts selected from the group consisting of a first part, a first part and a second part, and a first part, a second part and a third part.

3. The system according to claim 2, wherein said workpiece comprises at least a first part and a second part:
said first part comprises a first part bottom surface and a first part top surface;
said second part comprises a second part bottom surface and a second part top surface;
said workpiece being such that said second part bottom surface is positioned substantially in mechanical contact with said first part top surface;
said first part bottom surface being said workpiece bottom surface and said second part top surface being said workpiece top surface.

4. The system according to claim 2, wherein said first part is electrically insulating.

5. The system according to claim 2, wherein said first part comprises a conductive material.

6. The system according to claim 2, wherein said workpiece comprises at least a first part and a second part, said second part is electrically insulating.

7. The system according to claim 2, wherein said workpiece comprises at least a first part and a second part, said first part is electrically insulating and said second part comprises an electrically conductive material.

8. The system according to claim 2, wherein said first part is transparent or opaque to said laser radiation from said laser device.

9. The system according to claim 2, wherein said first part comprises at least one of the following materials: polymer, glass or ceramic.

10. The system according to claim 2, wherein said first part is a transparent polymer substrate comprising channels having at least a submicrometer dimension.

11. The system according to claim 1, further comprising a control for activating said first electrostatic charge generating device before or during the laser machining or welding of said workpiece to hold it in position relative to said electrically conductive support when exposed to laser radiation generated by said laser device.

12. The system according to claim 1, wherein said electrically conductive support is metallic, grounded, and configured to receive or support said workpiece, said workpiece bottom surface being positioned in mechanical contact with said electrically conductive support, so that said workpiece and said electrically conductive support attract each other when oppositely charged.

13. The system according to claim 1, wherein said electrostatic charge generating device is spaced from said workpiece top surface for generating charges without mechanical contact with said workpiece top surface.

14. The system according to claim 1, wherein said electrically conductive support is a grounded metal roller configured to guide or support said workpiece by coming into mechanical contact with said workpiece bottom surface.

15. A method for holding a workpiece in position and for exposing the workpiece to laser radiation, said workpiece having
a workpiece bottom surface and
a workpiece top surface, said workpiece bottom surface and said workpiece top surface being electrically insulated from each other,
said method comprising the following steps:
a) providing a system comprising:
a first electrostatic charge generating device for generating electrostatic charges on said workpiece top surface;
an electrically conductive support for forming electrostatic charges of opposite signs to those generated by said electrostatic charge generating device on said workpiece bottom surface;
a laser device for laser machining or welding said workpiece;
b) positioning said workpiece on said electrically conductive support;
c) activating said first electrostatic charge generating device to generate electrostatic charges on said workpiece top surface so as to form electrostatic charges of opposite signs to those generated by said electrostatic charge generating device on said workpiece bottom surface to hold said workpiece in position on said electrically conductive support;
d) irradiating said workpiece with said laser device for laser machining or welding.

* * * * *